United States Patent Office 3,326,838
Patented June 20, 1967

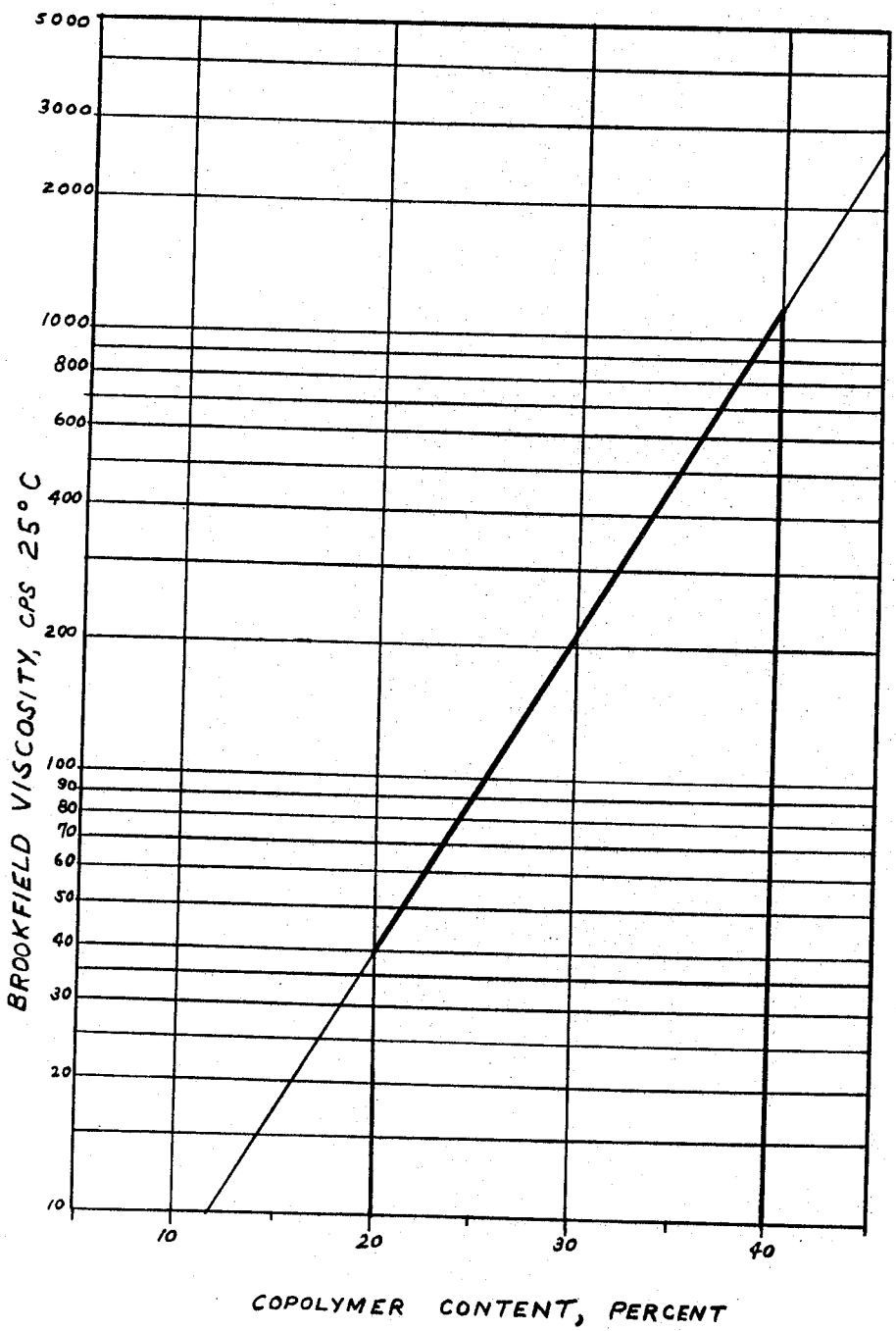

3,326,838
LOW MOLECULAR WEIGHT COMPOSITIONS OF HIGH VINYLIDENE CHLORIDE-CONTENT COPOLYMERS
Richard Bolstad, Brooklyn, and Elihu J. Aronoff, Glen Oaks, N.Y., Paul D. Whyzmuzis, Clifton, N.J., and Eileen B. Maloney, Brooklyn, N.Y., assignors to Interchemical Corporation, New York, N.Y., a corporation of Ohio
Filed Jan. 31, 1964, Ser. No. 341,701
40 Claims. (Cl. 260—31.2)

This invention relates to copolymers of high vinylidene chloride-content, that is copolymers comprising at least 65 to 70% vinylidene chloride. More particularly, it relates to novel low molecular weight copolymers of at least 70% vinylidene chloride and acrylic acids or itaconic acid which comprise most of the remainder of the copolymer. This invention further relates to novel coating compositions containing these copolymers as well as a process for making the copolymers.

Copending application S.N. 341,542 filed January 31, 1964, and now abandoned, entitled "A Novel Process for Making Copolymers of Vinylidene Chloride and Compositions Made by Said Process," in the names of R. Bolstad, E. Aronoff and E. Maloney describes low molecular weight predominantly vinylidene chloride copolymers which are highly soluble in a wide variety of organic solvents to provide novel coating compositions and adhesives of predominantly vinylidene chloride copolymers having high copolymer or solids contents at coating viscosities. The copolymers of said copending application are predominantly vinylidene chloride (at least 65%) copolymerized with olefinically unsaturated monomers which are primarily either acrylonitrile, lower alkyl acrylates, lower alkyl itaconates, N-vinyl-2-pyrrolidone or methylvinyl ketone.

In addition to their unique high solubility properties as well as the property of forming high solids content solutions at coating viscosities in a variety of solvents which greatly facilitates coating operations and markedly reduces solvent loss, the copolymers of the copending application provide coatings of very low moisture vapor transmission and gas permeability, increased resistance to grease, high gloss, flexibility, high stability, particularly in the presence of heat or ultraviolet light and good adhesion to substrates. This combination of properties had not been heretofore achieved in coatings of high vinylidene chloride-content copolymers.

The unique nature of the copolymers of the copending application may be primarily attributed to the novel process for making them. This process which gives greater than 90% conversion of monomers to copolymer involves the copolymerization of aforementioned combinations of monomers under the following conditions: a reaction temperature in range of from 55° to 70° C.; a reaction time of over 6 hours and preferably 12 to 18 hours in the presence of a free-radical addition polymerization initiator having a half-life of from 1 to 25 hours at 60° C. in benzene.

The novel copolymers of the present invention and coating compositions thereof provide all of aforementioned desirable properties and advantages of the high vinylidene chloride-content copolymers and coating compositions of the copending application but in addition have the following advantages:

(1) The coatings of this invention display even greater adhesion to a wide variety of substrates. The coatings are heat sealable and, also, can be used to prepare laminates with a wide variety of substrates.

(2) The coatings have excellent block resistance, that is papers coated with the coating may be placed in contact with each other, coated surface to coated surface, under a pressure of 2 pounds per square inch and heated at 150° F. for 2 hours and then be separable with no sticking. Such block resistance is another property highly desirable in the food packaging field. The block resistance is also excellent when a coated surface is placed into contact with an uncoated surface.

(3) The coatings while unaffected by moisture, may be readily removed from the substrate by dilute aqueous solutions of sodium hydroxide (e.g. from 2 to 5% NaOH), Since many papers, e.g., magazine cover paper, food wrapper papers, are often recovered by repulping processes which use dilute sodium hydroxide, it is highly desirable that coatings be separable from the paper substrates by the dilute sodium hydroxide. With our coatings, this may be readily done.

(4) Finally and perhaps most important, the copolymers of this invention are soluble in an even greater variety of solvents and cosolvents. Our novel copolymers are soluble in saturated aliphatic alcohols, particularly $C_1$ to $C_4$ alcohols, either alone or in the presence of small amounts of either volatile ester or ketone type solvents.

For example, our copolymers of vinylidene chloride and itaconic acid dissolved in $C_1$ to $C_4$ saturated aliphatic alcohols provide excellent coating compositions. It has been noted that in the solutions of our copolymers of vinylidene chloride and acrylic acids in alcohols alone, there is some cloudiness. This is due to the precipitation of very small amounts of the copolymer out of solution. However, the great preponderance of copolymer remains in solution and the precipitate has been found to have no effect on many of the properties of the coating. However, even this tendency toward precipitation of small amounts of the copolymer may be eliminated by the inclusion of small amounts, preferably 2% to 20% of the total solvent content of a volatile ester or ketone solvent as a cosolvent with the alcohol. This tendency may also be eliminated by maintaining the composition at 55° to 70° C. during application of the coating. The use of predominantly alcohol solvents in coating compositions of high vinylidene chloride-content copolymers makes possible the use of such high vinylidene chloride copolymers in areas such as food package coatings where other solvents in which the vinylidene chloride copolymers might be used would have undesirable odors or toxicities.

Also the use of alcohol solvents in the coatings makes possible the use of vinylidene chloride copolymers on substrates which might be damaged or otherwise affected by other solvents.

In addition, the use of alcohol solvents provides coatings which may be used on equipment which would be damaged by other solvents. An outstanding example of this is that by using alcohol solvents for our novel copolymers, we are able to lay down our coatings with a flexographic press. This is a very desirable use since the flexographic press is generally extensively used for overcoating printed food packages.

It should also be noted that the novel copolymers of this invention may be prepared using the aforementioned process with a $C_1$ to $C_4$ alcohol as the sole solvent. Furthermore, it has been found that the coating compositions in predominantly alcohol solvents as described above are highly dilutable with volatile hydrocarbon solvents, both aliphatic and aromatic. By dilutable, we mean that in the presence of an aliphatic alcohol, a hydrocarbon may be used as a cosolvent. The amount of hydrocarbon solvent present may be up to 18 times the amount of alcohol present depending on the nature of the solvent. For example, when an aromatic solvent such as toluene is used, the toluene present may be eighteen times the amount of alcohol present. If an aliphatic hydrocarbon solvent is used, then the hydrocarbon present may be up to 4 times the alcohol present. It has been found to be necessary to have some ester solvent present in addition to the hydrocarbon and alcohol. The ester which may be any conventional ester solvent, e.g., n-propyl acetate, isopropyl acetate or ethyl acetaate is preferably present in amounts equaling at least 80% of the copolymer weight. The advantages of such a composition are that hydrocarbons, particularly aliphatic hydrocarbons, are among the least expensive solvents. Also aliphatic hydrocarbons rank low among conventional solvents in undesirable odors and, thus, can be used in coatings for food packages. In addition, coatings with hydrocarbon solvents, particularly aliphatic hydrocarbons, dry very rapidly. Because our vinylidene chloride copolymers may be so used in aliphatic hydrocarbons, coatings of these copolymers may be applied with both flexographic and gravure printing equipment. Also aliphatic hydrocarbon solvents offer a wider range of boiling points from which selections may be made.

It should be noted that in the present specification and claims, all proportions are by weight unless otherwise set forth.

The novel copolymers of this invention comprise at least 70% and preferably 70 to 90% vinylidene chloride and a major portion of the remainder of the copolymer, preferably at least 15% of the copolymer weight, is acid monomer selected from the group consisting of itaconic acid and acrylic acids. As used in this specification and claims, "acrylic acids" is meant to be generic to both acrylic and methacrylic acids. These novel copolymers have a molecular weight in the range of 2,000 to 5,000, preferably 3,000 to 5,000.

In addition to the vinylidene chloride and acid components in the proportions described above, our novel copolymers may further contain any of a wide variety of olefinically unsaturated monomers. These olefinically unsaturated monomers may include nitriles, such as acrylonitrile and methacrylonitrile; the alkyl esters of acrylic and/or methacrylic acids such as ethyl hexylacrylate and octyl acrylate but for best results lower alkyl acrylates are preferred (these are defined as the $C_1$ to $C_4$ alkyl esters of acrylic and/or methacrylic acids) such as methyl, ethyl, propyl and butyl acrylates as well as methyl methacrylate; alkyl esters of itaconic acid, particularly lower itaconic esters such as methyl itaconate, butyl itaconate, dimethyl itaconate and dibutyl itaconate; nitrogen-vinyl polymers such as N-vinyl-2-pyrrolidone; vinyl ketones such as methyl vinyl ketone, ethyl vinyl ketone and vinyl phenyl ketone; acrolein and methacrolein amides such as acrylamide, methacrylamide, methylolacrylamide and methylolmethacrylamide; hydroxy compounds such as ethylene glycol monoacrylate and monomethacrylate, propylene glycol monoacrylate and monomethacrylate, glycerol monoacrylate and monomethacrylate, and hydroxyethyl methacrylate; glycidyl acrylate and glycidyl methacrylate; styrene, alphamethyl styrene and the various vinyl toluenes; ethylene glycol dimethacrylate; chloroprene and isoprene; cyclopentadiene and substituted cyclopentadiene such as dihydroxy cyclopentadiene; 2-hydroxymethyl-5-norbornene; maleic anhydride as well as esters of unsaturated dibasic acids such as dimethyl maleate and dibutyl fumarate; vinyl esters such as vinyl acetate; vinyl propionate and vinyl stearate as well as vinyl chloride; and vinyl alkyl ethers such as vinyl butyl ether, vinyl ethyl ether and vinyl hexyl ether.

In making the copolymers of this invention, the vinylidene chloride, the acrylic or itaconic acid and any additional olefinically unsaturated monomers are copolymerized at a reaction temperature in the range of 55° C. to 70° C. and a reaction time of over 6 hours and preferably 12 to 18 hours in the presence of a free-radical addition polymerization initiator or catalyst having a half-life of from 1 to 25 hours at 60° C. Suitable initiators having these properties include azo compounds such as azobisisobutyronitrile and organic peroxygen compounds such as lauryl peroxide, acetyl peroxide, isopropyl percarbonate, t-butyl peroxy pivalate and low temperature activated peroxide decompositions.

It should also be pointed out that unlike the process of the copending application, in the process of this invention it is not necessary to conduct the polymerization in the presence of a stabilizer for vinylidene chloride. Some stabilizers such as dibutyl tin dilaurate may have a corrosive effect on stainless steel equipment. Accordingly, with the elimination of such stabilizer, this possible effect is eliminated.

In addition to being soluble in powerful solvents such as furans and dioxan in which other high vinylidene chloride-content copolymers may also be soluble, the novel copolymers of this invention are highly soluble in volatile ketone solvents such as acetone, methyl ethyl ketone, methyl isobutyl ketone and cyclohexanone and volatile ester solvents such as methyl acetate, ethyl acetate, propyl acetate and butyl acetate. In these solvents, high solids (copolymer) content solutions are obtainable at coating viscosities. As will be set forth later in this specification, at solids contents of 20 to 40%, such coating compositions have low viscosities substantially below 2000 cps.

As previously mentioned, the copolymers of this invention are also soluble in aliphatic alcohols, particularly saturated $C_1$ to $C_4$ aliphatic alcohols. The alcohols which have been tried as solvents include methanol, ethanol, isopropanol, n-propanol and n-butanol.

As previously set forth in detail, hydrocarbons both aromatic and aliphatic may be used as cosolvents with the aliphatic alcohols. The aromatic solvents which may be used include toluene, xylene, benzene and chlorobenzene. Any conventional aliphatic hydrocarbon coating solvent may be used. We have used solvents having boiling ranges in the range of from 130° F. up to 550° F. and K.B. values in the range of from 30 to 45.

We have noted that the coating compositions of this invention may display a tendency to have a corrosive effect on some metal equipment. Where this tendency is displayed, the addition of small amounts of either phosphoric acid or a sodium hydrogen phosphate, preferably sodium dihydrogen phosphate will inhibit this tendency without otherwise affecting the coating composition properties. When used, it is preferable that the inhibitor constitute from 0.5% to 4% of the weight of the copolymer. Other conventional inhibitors such as propylene oxides or organometallic compounds may be used.

The coating compositions of this invention may contain coloring matter such as pigments. The color compositions may be formulated and used as inks with any conventional ink additives. Except for iron pigments, particularly pigments with reactive iron groups, substantially conventional pigments may be used including titanium dioxides, chrome yellows, lithol pigments, barium pigments, calcium pigments and Cyan blue pigments.

In carrying out the process for making the novel copolymers of this invention, the monomeric material to be copolymerized may be dissolved in any solvent conventionally used for free-radical solution polymerization. Any of the solvents or solvent combinations used in our novel coating compositions may be used as solvents during the copolymerization process. It is, however, preferable to use the ketone and ester solvents as copolymerization solvents. Preferably the monomeric material being polymerized in our process constitutes from 40% to 80% and most preferably from 50% to 70% of the total weight of the solution being polymerized. The amount of initiator or catalyst present is preferably from 1.0% to 7% and most preferably from 2.0% to 3.5% of the weight of monomeric material present.

Any of the conventional additives such as waxes, plasticizers or wetting agents used in coating compositions may be used in the coating compositions of this invention.

The following examples will further illustrate the practice of this invention:

Example 1

| | Parts by wt. |
|---|---|
| Vinylidene chloride | 75 |
| Acrylic acid | 25 |
| Ethyl alcohol | 54 |
| Lauryl peroxide | 3 |

The above ingredients are placed in a kettle and maintained at a temperature of 60° C. under an inert atmosphere for 17 hours with continuous agitation. There is a 100% conversion of monomeric material to the copolymer. The copolymer has a molecular weight $\overline{M}m$. of about 4500.

Example 2

| | Parts by wt. |
|---|---|
| Vinylidene chloride | 75 |
| Acrylic acid | 25 |
| Acetone | 100 |
| Lauryl peroxide | 3 |

Example 1 is repeated using the above ingredients. There is 100% conversion of monomeric material to the copolymer. The viscosity of the resulting solution is about 2.4 poises.

Example 3

| | Parts by wt. |
|---|---|
| Vinylidene chloride | 70 |
| Itaconic acid | 30 |
| Tetrahydrofuran | 100 |
| Lauryl peroxide | 1.5 |
| Acetyl peroxide | 1.5 |

The above ingredients are reacted in accordance with the procedure and conditions of Example 1 with 100% conversion of monomers to copolymer.

Example 4

| | Parts by wt. |
|---|---|
| Vinylidene chloride | 75 |
| Acrylic acid | 25 |
| Methyl ethyl ketone | 100 |
| Lauryl peroxide | 3.0 |

The procedure and conditions of Example 1 are repeated using the above ingredients with over a 95% conversion of monomers to copolymer. The copolymer has a molecular weight $\overline{M}m$. of 4000 to 5000.

Example 5

| | Parts by wt. |
|---|---|
| Vinylidene chloride | 85 |
| Itaconic acid | 15 |
| Tetrahydrofuran | 150 |
| Lauryl peroxide | 1.5 |
| Acetyl peroxide | 1.5 |

The conditions and procedure of Example 1 are repeated using the same ingredients except that the reaction time is 15 hours. There is 89% conversion of monomers to copolymer.

Example 6

| | Parts by wt. |
|---|---|
| Vinylidene chloride | 76 |
| Acrylic acid | 14 |
| Itaconic acid | 10 |
| Isopropyl acetate | 27 |
| Ethyl alcohol | 27 |
| Lauryl peroxide | 3.0 |

The conditions and procedure of Example 1 are repeated using the above ingredients. There is a 93.5% conversion of monomers to copolymer.

Example 7

| | Parts by wt. |
|---|---|
| Vinylidene chloride | 71 |
| Itaconic acid | 22 |
| Methyl acrylate | 7 |
| Tetrahydrofuran | 100 |
| Acetyl peroxide | 1.5 |
| Lauryl peroxide | 1.5 |

Following the procedure and conditions of Example 1, the above ingredients are reacted with a 100% conversion of monomers to copolymer.

Example 8

| | Parts by wt. |
|---|---|
| Vinylidene chloride | 71 |
| Itaconic acid | 22 |
| Butyl acrylate | 7 |
| Isopropyl alcohol | 15 |
| Ethyl acetate | 28 |
| Lauryl peroxide | 3 |

Following the procedure and conditions of Example 1, the above ingredients are reacted with the 92% conversion of monomers to copolymer. When a sufficient amount of a 2/1 mixture of isopropyl alcohol/ethyl acetate is added to produce a 50% solution of copolymer, the resulting solution has a viscosity of 1.8 poises.

Example 9

| | Parts by wt. |
|---|---|
| Vinylidene chloride | 75 |
| Methyl acrylate | 10 |
| Acrylic acid | 10 |
| Methacrylic acid | 5 |
| Isopropyl alcohol | 15 |
| Ethyl acetate | 28 |
| Lauryl peroxide | 3 |

Following the procedure and conditions of Example 1, the above ingredients are reacted with a 95% conversion of monomers to copolymer.

Example 10

| | Parts by wt. |
|---|---|
| Vinylidene chloride | 75 |
| Acrylonitrile | 5 |
| Acrylic acid | 20 |
| n-Propyl acetate | 54 |
| Lauryl peroxide | 3 |
| Dibutyltin dilaurate | 1.0 |

Following the procedure and conditions of Example 1, the above ingredients are reacted with a 99.3% conversion of monomers to copolymer.

Example 11

| | Parts by wt. |
|---|---|
| Vinylidene chloride | 75 |
| Acrylic acid | 20 |
| α-Methyl styrene | 5 |
| Ethyl alcohol | 54 |
| Lauryl peroxide | 3 |

Following the procedure and conditions of Example 1, the above ingredients are reacted with a 94.6 conversion of monomers to copolymer. Sufficient ethyl alcohol is added to make a 50% solution. The solution has a viscosity of from 7 to 8 poises.

Example 12

| | Parts by wt. |
|---|---|
| Vinylidene chloride | 75 |
| Acrylic acid | 25 |
| n-Propyl acetate | 54 |
| Lauryl peroxide | 3 |

Following the procedure and conditions of Example 1, the above ingredients are reacted with over a 95% conversion of monomer to copolymer; 46 parts of ethanol are added.

Example 13

| | Parts by wt. |
|---|---|
| Vinylidene chloride | 75 |
| Acrylic acid | 25 |
| Ethyl acetate | 54 |
| Lauryl peroxide | 3 |

Following the procedure and conditions of Example 1, the above ingredients are reacted with over a 98% conversion of monomers to copolymer.

Example 14

| | Parts by wt. |
|---|---|
| Vinylidene chloride | 75 |
| Acrylic acid | 25 |
| Methyl ethyl ketone | 54 |
| Lauryl peroxide | 3 |

Following the procedure and conditions of Example 1, the above ingredients are reacted with over a 98% conversion of monomers to copolymer.

Example 15

To the solution of Example 13, there are added 96 parts of ethyl acetate. The solution is then coated by means of a bar of Lowe's S–41 clay coated cardboard stock at a wet coatnig weight of 20 mg./square inch and the coating is baked at 300° F. for one minute in a forced draft oven. The resulting coating is white, clear, has excellent gloss, flexibility, adhesion to the substrate and the coated cardboard has a moisture vapor transmission markedly reduced to 2.3 g./100 square inches/24 hours. (Moisture vapor transmission is determined by covering the mouth of a cup of a selected diameter containing calcium chloride with the material to be tested, exposing the cup to an atmosphere of about 95 to 100% relative humidity for 24 hours and then determining the gain in weight of the calcium chloride.) The coated stock is then tested for block resistance by placing 2 coated surfaces face to face with each other under a pressure of 2 pounds per square inch and heating at 150° F. for 2 hours. After this period the two surfaces are permitted to cool and then peeled apart. The two surfaces peel apart with substantially no sticking indicating excellent block resistance.

The coated surfaces are also tested for solubility in dilute NaOH. A 5% aqueous NaOH solution readily dissolves the coating.

Example 16

Example 15 is repeated using the same procedure and conditions except that in place of the composition of Example 14, the compositions of Examples 2, 4, 6, 8, 9, 10, and 13 are respectively used and that prior to coating the compositions are reduced to about a 35% solids content by adding more of the respective solvents of the compositions prior to coating. The properties of the resulting coatings including gloss, flexibility, adhesion, low moisture vapor transmission, block resistance and solubility in dilute NaOH solutions are about the same as that of the coating of Example 15.

Coating compositions of the high vinylidene chloride-content copolymers of this invention which contain substantial amounts of acrylic and itaconic acids in the conventional ester and ketone coating solvents are prepared at copolymer contents of 20%, 30% and 40% based upon the total weight of the solution. This range of copolymer contents represents the range most desirable in most coating operations. The viscosities of the solutions within this range of copolymer content are determined (Brookfield method at 25° C.) and found to be substantially below 2000 cps. The viscosities are of the same order as the viscosities of the coating composition in ester and ketone solvents described in the aforementioned copending application S.N. 341,542. At 20% copolymer content, the maximum viscosity of our coating solutions in ester or ketone solvents is 40 cps., at 30% copolymer content, the maximum viscosity is 240 cps. and at 40% copolymer content, the maximum viscosity is 1200 cps. In order to illustrate this aspect of our invention, the maximum viscosities of our coating compositions in ester and ketone solvents are plotted on the graph in the drawings and appear as the oblique straight line. In this graph, the abscissa is copolymer solids content expressed as a percentage of the total weight of the solution and the ordinate is the viscosity expressed in centipoises. (While the units of the ordinate are expressed linearly in cps., they are plotted at logarithmic intervals.)

In order to fully illustrate the viscosity-copolymer content relationships expressed in the graph, the viscosities of some illustrative coating compositions at solids contents of 20, 30 and 40% are set forth in Table I which follows:

TABLE I

| Composition | Viscosities in cps. of Solids Contents of— | | |
|---|---|---|---|
| | 20% | 30% | 40% |
| Copolymer of Example 1 dissolved in ethyl acetate | 40 | 150 | 1,010 |
| Copolymer of Example 1 dissolved in methyl ethyl ketone | 20 | 74 | 450 |
| Copolymer of 80% vinylidene chloride and 20% acrylic acid made in accordance with the procedure of Example 13 dissolved in ethyl acetate | 39 | 116 | 670 |
| Copolymer of 80% vinylidene chloride and 20% acrylic acid made in accordance with the procedure of Example 14 dissolved in methyl ethyl ketone | 32 | 84 | 500 |

All of these viscosities, when plotted on the graph in the drawing for their respective solids contents fall on or below the oblique line.

While ethyl acetate and methyl ethyl ketone are used as representative of conventional ester and ketone solvents, it should be noted that all conventional ester and ketone solvents including n-propyl acetate, isopropyl acetate, methyl isobutyl ketone and acetone give results of the same order.

Example 17

The copolymer of Example 3 is recovered from the solution thereof by any conventional method, e.g., spraying the solution onto a surface, drying the coating and then redissolving the copolymer in the desired solvent. Then, using ethanol as the solvent, solutions of the copolymer are prepared at solids contents of 20 to 40%. The slightly cloudy solutions flow freely and may readily be used in coating applications.

Example 18

The following are mixed to form a solution:

| | Parts by wt. |
|---|---|
| Copolymer of Example 13 | 100 |
| n-Propyl acetate | 40 |
| Ethanol | 360 |

The above solution is then applied by a flexographic press as an overcoating to the printed surface of a paper sheet at 1.7 lbs. per ream (3000 square feet), and the coating is dried at about 180° F. for 15 seconds. The resulting coating is clear, has excellent gloss, flexibility, outstanding adhesion to the substrate and the coated paper has a moisture vapor transmission markedly reduced to 2.5 g./100 square inches/24 hours. In addition the coating has excellent block resistance and is soluble in dilute NaOH which is used in repulping and deinking paper.

This example is repeated using isopropyl acetate and ethyl acetate respectively as substitutes for n-propyl acetate and isopropanol and n-propanol respectively as substitutes for ethanol with the same results as with n-propyl acetate and ethanol.

Example 19

The following are mixed to form a solution:

| | Parts by wt. |
|---|---|
| Copolymer of Example 14 | 90 |
| Methyl ethyl ketone | 33 |
| Ethanol | 167 |

The above solution is then applied as an overcoating on cellulose acetate film by a flexographic press in accordance with the process described in Example 18.

The coating has all of the same desirable properties of the coatings of Example 18.

This example is also repeated using acetone as a substitute for methyl ethyl ketone with the same results.

Example 20

The coating described in Example 19 is applied in accordance with the procedure of Example 18 to the following substrates Mylar film (polyethylene terephthalate), cellophane, paper sheets, cellulose acetate, glassine and polyethylene.

The resulting coatings have all of the desirable properties of the coatings of Examples 18 and 19, and in addition, the coatings may be fused by conventional heat-sealing methods in making heat sealed packages from the coated Mylar film and glassine.

In addition the coating of Example 19 displayed good adhesion to the following metals: stainless steel, black iron, tin plate, copper and zinc.

Example 21

Example 18 is repeated using the following coating composition:

| | Parts by wt. |
|---|---|
| Copolymer of Example 8 | 100 |
| Methyl ethyl ketone | 15 |
| Isopropanol | 285 |

The resulting coating has all of the desirable properties of the coating of Example 18.

Example 22

Coating compositions of the copolymers of this invention have been found to have a corrosive effect on steel used in the coating apparatus, e.g., a flexographic press. In order to inhibit this corrosive effect, small amounts of either sodium hydrogen phosphate, propylene oxide, or phosphoric acid may be added to the coating composition. For example, the following composition:

| | Parts by wt. |
|---|---|
| Polymer of Example 13 | 100 |
| Ethyl acetate | 30 |
| Ethanol | 270 |
| Phosphoric acid | 5 | is substituted for the composition of Example 18 and a coating is prepared in accordance with the procedure of Example 18. The resulting coated substrate had the same properties as that of Example 18. The corrosion inhibitor substantially did not have any effect on the properties of the coating.

Example 23

| | Parts by wt. |
|---|---|
| Copolymer of Example 13 | 100 |
| Ethyl acetate | 80 |
| Lactol Spirits (predominantly aliphatic hydrocarbon solvent having a boiling range of 203° to 232° F. and a K.B. value of 42.5) | 200 |
| Isopropanol | 50 |

The above solution is applied by gravure press coating cylinder as an overcoating to the printed surface of a paper sheet at 1.7 lbs. per ream (3,000 square ft.), and the coating is dried at about 180° F. for 15 seconds. The resulting coating is clear, has excellent gloss, flexibility, outstanding adhesion to the substrate and the coated paper has a greatly reduced moisture vapor transmission. In addition, the coating has excellent block resistance and is soluble in dilute NaOH.

Example 24

Example 23 is repeated using the copolymers of Examples 4, 7 and 10 in place of the copolymer of Example 13; the resulting coated substrate has the same desirable properties as does that of Example 23.

Example 25

| | Parts by wt. |
|---|---|
| Copolymer of Example 13 | 100 |
| n-Propyl acetate | 80 |
| Super Naphtholite (predominantly aliphatic hydrocarbon solvent having a boiling range of 200° F. and a K.B. value of 36.0) | 200 |
| Isopropanol | 100 |

In accordance with the procedure of Example 23, the above solution is applied to the paper substrate of Example 23. The resulting coated substrate has all of the desirable properties of the coated substrate of Example 23.

Examples 26 to 28

Example 23 is repeated using the same procedure and conditions, except that in place of the coating compositions used in Example 23 the following compositions are used.

Example 26

| | Parts by wt. |
|---|---|
| Copolymer of Example 13 | 100 |
| Ethyl acetate | 80 |
| Textile Spirits (a predominantly aliphatic hydrocarbon having a boiling range of 145°–175° F. and a K.B. value of 32.8) | 150 |
| Ethanol | 100 |

Example 27

| | Parts by wt. |
|---|---|
| Copolymer of Example 13 | 100 |
| Ethyl acetate | 80 |
| Toluene | 280 |
| Ethanol | 20 |

Example 28

| | Parts by wt. |
|---|---|
| Copolymer of Example 13 | 100 |
| Ethyl acetate | 80 |
| Toluene | 360 |
| Isopropanol | 20 |

The resulting coated substrates have all of the desirable properties of the coated substrate of Example 23.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method for making low molecular weight copolymers containing at least 70% vinylidene chloride which comprises copolymerizing a solution in a volatile organic solvent of monomeric material comprising at least 70% vinylidene chloride and at least 15% of an acid selected from the group consisting of acrylic acid and itaconic acid at a temperature of from 55° to 70° C. for a period of at least 6 hours in the presence of a free-radical addition polymerization initiator selected from the group consisting of azobisisobutyronitrile and organic peroxygen compounds having a half-life of from 1 to 25 hours at 60° C.

2. The method of claim 1 wherein the reaction period is from 12 to 18 hours.

3. The method of claim 1 wherein the initiator comprises lauryl peroxide.

4. The method of claim 1 wherein the major portion of the remaining monomeric material is acrylic acid.

5. The method of claim 1 wherein the major portion of the remaining monomeric material is itaconic acid.

6. The method of claim 1 wherein the volatile solvent comprises an ester solvent.

7. The method of claim 6 wherein the ester solvent is ethyl acetate.

8. The method of claim 6 wherein the ester solvent is n-propyl acetate.

9. The method of claim 1 wherein the volatile solvent comprises a ketone.

10. The method of claim 9 wherein the keton is methyl ethyl ketone.

11. The method of claim 1 wherein the volatile solvent comprises a mixture of a saturated $C_1$ to $C_4$ aliphatic alcohol and an ester.

12. The method of claim 1 wherein the volatile solvent comprises a mixture of a saturated $C_1$ to $C_4$ aliphatic alcohol and a ketone.

13. The method of claim 1 wherein said acid is itaconic acid and said solvent is a saturated $C_1$ to $C_4$ aliphatic alcohol.

14. A coating composition comprising a major portion of a solution in a volatile organic solvent selected from the group consisting of ketone solvents and ester solvents of a copolymer having a molecular weight of from 2,000 to 5,000 comprising at least 70% vinylidene chloride and at least 15% of an acid selected from the group consisting of acrylic acid and itaconic acid, said coating composition having viscosities falling below the oblique line when plotted on the graph of the drawing at copolymer contents of from 20% to 40%, the abscissa of said graph being said copolymer content expressed as a percentage of the total composition weight and the ordinate being viscosity in centipoises.

15. The composition of claim 14 wherein said acid is acrylic acid.

16. The composition of claim 14 wherein said acid is itaconic acid.

17. The composition of claim 14 wherein said solvent is an ester solvent.

18. The composition of claim 14 wherein said solvent is a ketone solvent.

19. The composition of claim 17 wherein said ester solvent is ethyl acetate.

20. The composition of claim 18 wherein said ketone solvent is methyl ethyl ketone.

21. A coating composition comprising a major portion of a solution of a copolymer having a molecular weight of from 2,000 to 5,000 of 70% to 80% vinylidene chloride and the remainder of the copolymer being acrylic acid in a saturated $C_1$ to $C_4$ aliphatic alcohol.

22. A coating composition comprising a major portion of a solution of a copolymer having a molecular weight of from 2,000 to 5,000 of 70% to 85% vinylidene chloride and at least 15% of an acid monomer selected from the group consisting of acrylic acid and itaconic acid in a volatile organic solvent comprising a saturated $C_1$ to $C_4$ aliphatic alcohol and a member selected from the group consisting of ketone solvents and ester solvents, said member being from 2 to 20% of the total solvent content and the remainder being said alcohol.

23. A coating composition comprising a major portion of a solution of a copolymer having a molecular weight of from 2,000 to 5,000 of 70% to 85% vinylidene chloride and at least 15% acrylic acid in a volatile organic solvent comprising from 2% to 20% ester solvent and the remainder a saturated $C_1$ to $C_4$ aliphatic alcohol.

24. The coating composition of claim 23 wherein the ester solvent is ethyl acetate.

25. A coating composition comprising a major portion of a solution of a copolymer having a molecular weight of from 2,000 to 5,000 of 70% to 85% vinylidene chloride and at least 15% acrylic acid in a solvent comprising from 2% to 20% ketone solvent and the remainder saturated $C_1$ to $C_4$ aliphatic alcohol.

26. The coating composition of claim 25 wherein the ketone solvent is methyl ethyl ketone.

27. A coating composition comprising a major portion of a solution of a copolymer having a molecular weight of from 2,000 to 5,000 of 70% to 85% vinylidene chloride and at least 15% itaconic acid in a saturated $C_1$ to $C_4$ aliphatic alcohol.

28. A coating composition comprising a major portion of a solution of a copolymer having a molecular weight of from 2,000 to 5,000 of 70% to 85% vinylidene chloride and at least 15% of an acid monomer selected from the group consisting of acrylic acid and itaconic acid in a volatile organic solvent comprising a saturated $C_1$ to $C_4$ aliphatic alcohol, an ester solvent and a volatile hydrocarbon solvent the weight of said hydrocarbon solvent being from 1.5 to 18 times the weight of alcohol and more than 50% of the total solvent weight and the weight of said ester being from 0.8 to 4 times the weight of said alcohol.

29. The composition of claim 28 wherein said hydrocarbon solvent is an aromatic hydrocarbon.

30. The composition of claim 28 wherein said hydrocarbon solvent is an aliphatic hydrocarbon.

31. The coating composition of claim 29 wherein the maximum ratio of aromatic hydrocarbon:alcohol is 18:1.

32. The coating composition of claim 30 wherein the maximum ratio of aliphatic hydrocarbon:alcohol is 4:1.

33. The coating composition of claim 14 wherein the solution further includes a dissolved corrosion inhibitor selected from the group consisting of phosphoric acid and from 1 to 7% sodium dihydrogen phosphate based upon the weight of the copolymer.

34. The coating composition of claim 33 wherein the corrosion inhibitor is sodium dihydrogen phosphate.

35. The coating composition of claim 33 wherein the corrosion inhibitor is phosphoric acid.

36. The coating composition of claim 22 wherein the solution further includes a dissolved corrosion inhibitor selected from the group consisting of phosphoric acid and from 1 to 7% sodium dihydrogen phosphate based upon the weight of the copolymer.

37. The coating composition of claim 28 wherein the solution further includes a dissolved corrosion inhibitor selected from the group consisting of phosphoric acid and from 1 to 7% sodium dihydrogen phosphate based upon the weight of the copolymer.

38. A copolymer comprising from 70% to 85% vinylidene chloride and at least 15% of an acid monomer selected from the group consisting of acrylic acid and itaconic acid having a molecular weight of from 3000 to 5000.

39. The copolymer of claim 38 wherein said acid monomer is itaconic acid.

40. The copolymer of claim 38 wherein said acid monomer is acrylic acid.

References Cited

UNITED STATES PATENTS

| | | | |
|---|---|---|---|
| 2,545,317 | 3/1951 | Stuchlik | 260—32.8 |
| 2,675,334 | 4/1954 | Gray et al. | 260—32.8 |
| 2,819,984 | 1/1958 | Ackerman | 260—87.7 |
| 2,922,775 | 1/1960 | Mino et al. | 260—87.7 |
| 3,088,937 | 5/1963 | Trofimow et al. | 260—87.7 |

FOREIGN PATENTS 654,342   6/1951   Great Britain.

MORRIS LIEBMAN, *Primary Examiner.*

L. T. JACOBS, *Assistant Examiner.*